United States Patent [19]

Cordingley et al.

[11] Patent Number: 4,580,597
[45] Date of Patent: Apr. 8, 1986

[54] FLUID DISTRIBUTION SYSTEM

[75] Inventors: Robert J. Cordingley, Houston; Lloyd S. Eubanks, Texas City, both of Tex.

[73] Assignee: Monsanto Company, St. Louis, Mo.

[21] Appl. No.: 723,126

[22] Filed: Apr. 15, 1985

[51] Int. Cl.⁴ .............................................. E03B 11/00
[52] U.S. Cl. ................................ 137/561 A; 137/590; 405/51
[58] Field of Search .............. 405/43, 51; 137/561 A, 137/590

[56] References Cited

U.S. PATENT DOCUMENTS

| 11,915 | 6/1901 | Barker | 137/590 |
| 994,115 | 6/1911 | Harris | 405/51 |
| 1,978,015 | 10/1934 | Erdman | 137/590 |
| 4,302,338 | 11/1981 | Pfohl et al. | 137/561 A |

FOREIGN PATENT DOCUMENTS 593064  7/1959  Italy ........................ 405/51

Primary Examiner—A. Michael Chambers
Attorney, Agent, or Firm—Thomas N. Wallin

[57] ABSTRACT

A fluid distribution system for a vessel comprises a fluid supply main conduit and a plurality of parallel co-planar branch pipes, the branch pipes having terminal orifices equidistantly spaced from the inner wall of the vessel by about half the distance between consecutive adjacent orifices along each branch pipe.

7 Claims, 1 Drawing Figure

U.S. Patent     Apr. 8, 1986     4,580,597
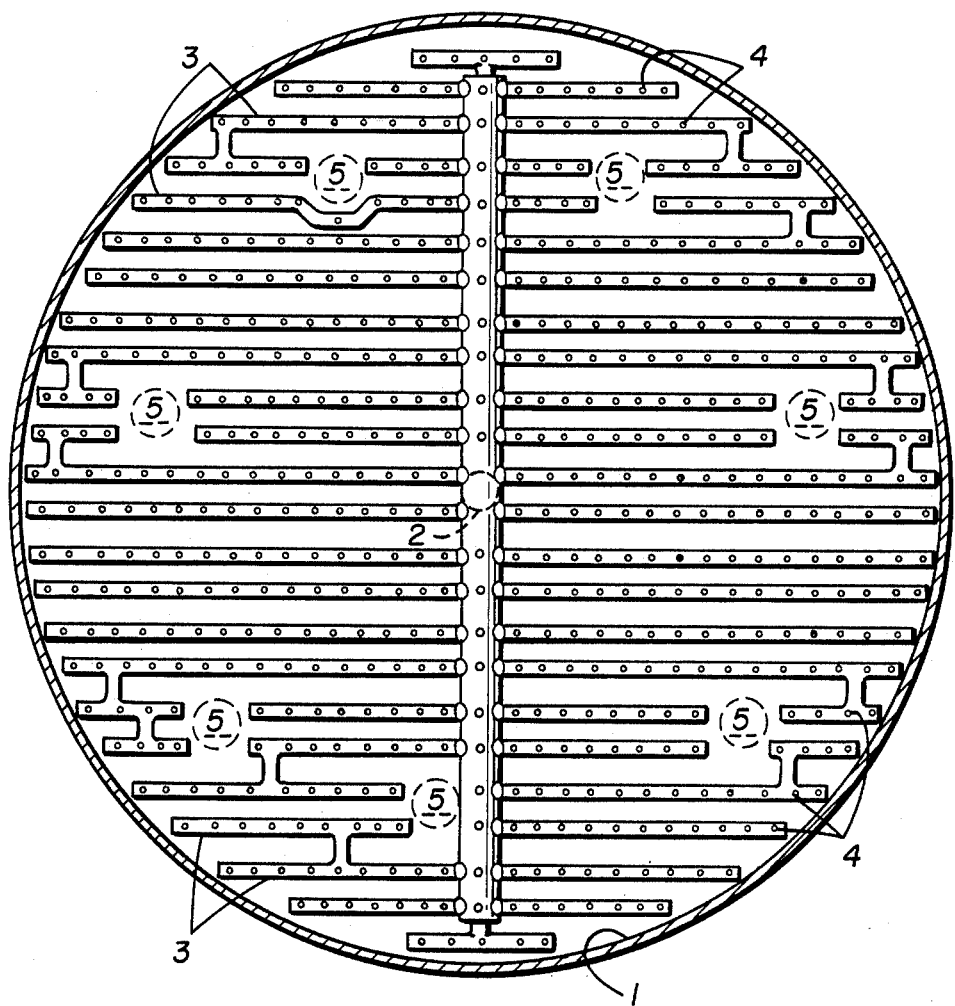

FLUID DISTRIBUTION SYSTEM

BACKGROUND OF THE INVENTION

A. Field of the Invention

The invention pertains to fluid distribution systems, and particularly distributors of the perforated-pipe variety.

B. Background of the Invention

It is well known that uniform fluid distribution is essential for efficient operation of chemical processing equipment such as contactors, reactors, mixers, burners, heat exchangers, extrusion dyes and textile-spinning chimneys. Optimum distribution involves a proper consideration to flow behavior in the distributor, flow conditions upstream of the distributor, and flow conditions downstream of the distributor. The simplest of prior art distributors is called the "Perforated-Pipe" distributor which, in it's simplest form, is a pipe with a series of perforations spaced equidistant along its length. In such a simple system, flow distribution is uniform where there is a proper balance between kinetic energy and momentum of force of the inlet stream, friction losses along the length of pipe and pressure drop across the outlet holes. When inlet-stream kinetic energy and momentum force predominate, increasing amounts of fluid will be discharged as the flow travels toward the closed end; and when friction losses along the pipe predominate, decreasing amounts of fluid will be discharged as the fluid travels toward the closed end. When an upstream disturbance, such as produced by a bend, is superimposed upon a predominate inlet-stream kinetic energy and momentum force, the flow from the outlet holes near the distributor inlet and near the closed end can be greater than in the middle.

In a perforated-pipe distributor, in order to keep the distribution of the fluid uniform within ±5%, the ratio of kinetic energy of the inlet stream to pressure drop across the outlet hole and friction loss in the pipe to pressure drop across the outlet hole should be equal to or less than one-tenth.

Ordinarily, in the case of perforated-pipes, an orifice coefficient of 0.6 to 0.63 is used. However, the orifice coefficient is a function of hole size relative to pipe diameter and wall thickness, flow rate through the hole, flow rate in the pipe across the hole and the like; and so the value of the orifice coefficient can vary considerably from the values ordinarily employed. Additional experimental data is usually needed to define the above function. If the component of the hole outlet velocity normal to the pipe wall is larger than the velocity along the pipe, the effect of the pipe velocity on the orifice coefficient is diminished.

Pressure change due to friction and momentum recovery over the length of the perforated-pipe distributor can in theory be shown to be $$\Delta h_p = \left(\frac{4fL}{D}\right) \frac{V_i^2}{2g_c}$$

where $\Delta h_p$ = net loss in head between the inlet and closed end of the pipe, ft. of flowing fluid; $f$ = Fanning friction factor, dimensionless; $L$ = pipe length, ft.; $D$ = pipe diameter, ft.; $V_i$ = average fluid velocity at inlet to pipe, ft./sec.; $g_c$ = dimensional constant, 32.17 (lb. mass) (ft.)/(lb. force) (sec.$^2$).

In addition to such well recognized engineering considerations, fluid distribution is affected by the positioning of fluid outlet orifices in the system. The present invention improves fluid distribution by an orifice positioning pattern which increases uniformity of fluid distribution, particularly when the fluid flow considerations discussed above are observed.

An object of the instant invention is to provide a distribution system meeting the above requirements and incorporating the above mentioned considerations all the while achieving a more efficient distribution system than that described in the prior art.

SUMMARY OF THE INVENTION

The invention is a distribution system for introducing fluid into a vessel, having an inner wall and a longitudinal dimension. The distribution system comprises;

(1) A vessel, preferably a substantially cylindrical vessel. (The term "substantially cylindrical" denotes a radius uniform ±10%.);

(2) A co-planar arrangement of fluid distribution conduit means transversing the vessel in a plane substantially perpendicular (±10% of absolute perpendicularity) to its axis. In a preferred embodiment, this arrangement may comprise a fluid supply main conduit conducting fluid to the interior of the vessel and co-planar pipes extending from the main conduit towards the vessel wall.

The elongated conduit means, for example, pipes, will have orifices along the length(s) thereof. A majority of the orifices will be equispaced along such length and preferably a majority of the orifices will be equispaced from each other in all directions—not merely along the length of the elongated conduit or pipe. In a further preferred embodiment the orifices which are closer to the vessel wall than to the vessel axis will be equally spaced along the conduits in which they are positioned and/or, most preferably, will be equispaced from each other in all directions.

Orifice spacings which are the same ±10% are considered to be "equal spacings". Further, unless otherwise indicated, all spacings, directions, angles, dimensions, set forth in this specification and the appended claims are intended to have a "tolerance" of ±10%.

Most importantly, a majority of the terminal orifices (a "terminal orifice" is the orifice of each branch pipe which is nearest the vessel wall) are equispaced from the vessel wall by a distance of from ⅓ to ⅔—preferably ½—the distance between the equispaced majority of orifices.

In the detailed description, reference will be made to the drawing in which the figure is a plan view of a distribution system in accordance with this invention.

DETAILED DESCRIPTION OF THE INVENTION

Referring now to the drawings, fluid supply main conduit 2 is located within a vessel having a wall 1. Flowably connected to fluid supply main conduit 2 are parallel planar fluid supply branch pipes 3 in each case extending nearly to inner wall 1. Fluid supply branch pipes 3 have a plurality of fluid orifices 4 directionaly oriented in a single longitudinal direction in spaced relationship to wall 1 such that the distance between wall 1 and each terminal orifice is essentially the same and about ⅓ to ⅔, preferably ½ the distances between the consecutive adjacent orifices along each branch pipe which latter distances are essentially the same. Dip legs provide for catalyst return from the top of a fluid bed reactor. They have no relavance to the fluid distribution system except to illustrate how obstacles are circumvented in the distribution.

What is claimed is:

1. In a fluid distribution apparatus comprising in combination:
   (1) a vessel having a wall
   (2) a fluid supply main conduit adapted to conduct fluid to the interior of said vessel
   (3) a plurality of substantially co-planar fluid supply branch pipes flowably connected to the main conduit and extending therefrom in a plane substantially perpendicular to the axis of said vessel towards the wall of said vessel
   said fluid supply branch pipes each having a plurality of orifices oriented to provide uni-directional fluid flow in an axial direction, the improvement characterized is that the spacing between a majority of the orifices along said pipes is substantially equal and the spacing between the wall of said vessel and a majority of the terminal orifices is substantially equal and is from $\frac{1}{3}$ to $\frac{2}{3}$ the substantially equidistant spacing of the majority orifices along said pipes.

2. The apparatus of claim 1 wherein said vessel is substantially cylindrical.

3. The apparatus of claim 2 wherein the spacing between at least 90% of the orifices along said branch pipes is substantially equal and the spacing between the wall of said vessel and at least 90% of the terminal orifices being substantially equal and being about $\frac{1}{2}$ the distance of the substantially equal spacing of the orifices along said branch pipes.

4. The apparatus of claim 2 wherein the orifices in each branch pipe which are closer to the wall of the vessel than to the vessel axis are substantially equidistantly spaced from each other along the length of said branch pipe.

5. In a fluid distribution apparatus comprising in combination a vessel having a co-planar arrangement of fluid distribution elongated conduit means transversing said vessel in a plane substantially perpendicular to the axis of said vessel, said conduit means having a plurality of orifices oriented to provide uni-directional fluid flow in an axial direction, the improvement characterized in that a majority of said orifices are spaced substantially equidistant from each other, and that a majority of the terminal orifices are substantially equally spaced from the vessel wall by a distance from $\frac{1}{3}$ to $\frac{2}{3}$ the substantially equidistant spacing between the majority of orifices.

6. The apparatus of claim 5 wherein said vessel is substantially cylindrical.

7. The apparatus of claim 6 wherein the orifice closer to the wall of the vessel than to the axis of the vessel are substantially equally spaced from each other.

* * * * *